Figure 1:
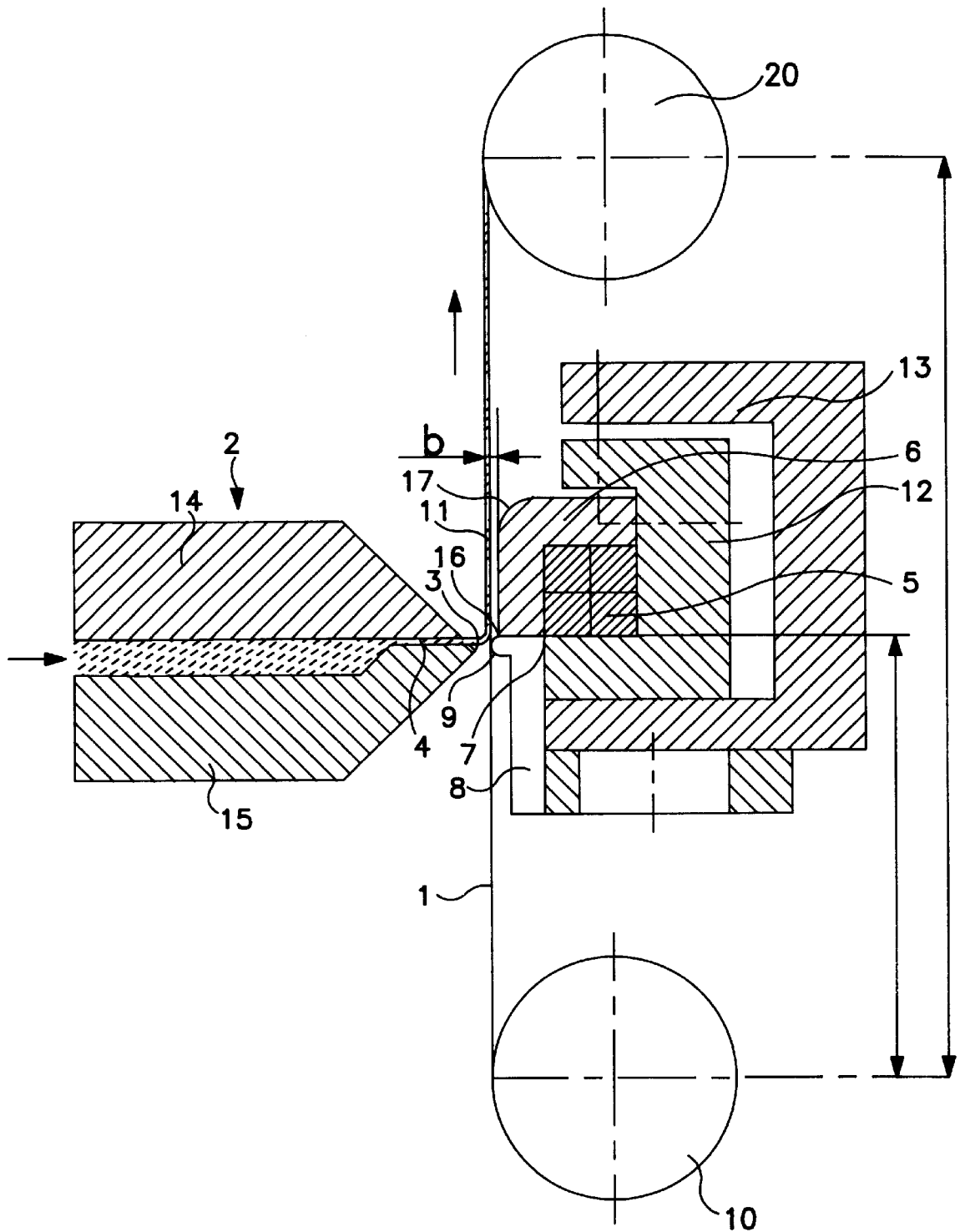

United States Patent
Nagler et al.

[11] Patent Number: 6,086,674
[45] Date of Patent: Jul. 11, 2000

[54] DEVICE FOR APPLYING MAGNETIZABLE BINDER-CONTAINING LAYERS TO NON-MAGNETIC SUBSTRATE BY MEANS OF AN EXTRUSION CASTER

[75] Inventors: Eberhard Nagler, München; Hans-Günter Wagner, Neuleiningen; Friedrich Brotz, Ludwigshafen, all of Germany

[73] Assignee: EMTEC Magnetics GmbH, Ludwigshafen, Germany

[21] Appl. No.: 09/011,609

[22] PCT Filed: Feb. 17, 1997

[86] PCT No.: PCT/EP97/00747

§ 371 Date: Feb. 12, 1998

§ 102(e) Date: Feb. 12, 1998

[87] PCT Pub. No.: WO97/30443

PCT Pub. Date: Aug. 21, 1997

[30] Foreign Application Priority Data

Feb. 17, 1996 [DE] Germany .............................. 196 05 899

[51] Int. Cl.[7] ....................................................... B05C 3/02
[52] U.S. Cl. ............................................. 118/419; 118/419
[58] Field of Search ..................................... 118/410, 419; 427/356, 549

[56] References Cited

U.S. PATENT DOCUMENTS

| 4,357,370 | 11/1982 | Alheid .................................... 118/248 |
| 5,601,647 | 2/1997 | Pertzsch et al. ........................ 118/419 |
| 5,641,355 | 6/1997 | Munch et al. ........................... 118/410 |

FOREIGN PATENT DOCUMENTS 1300645 12/1972 United Kingdom.

Primary Examiner—Brenda A. Lamb
Attorney, Agent, or Firm—Keil & Weinkauf

[57] ABSTRACT

An apparatus for applying magnetic dispersions to nonmagnetic substrates is optimized by means of an attracting magnet which is opposite the application slot of an extrusion coater and is covered with a soft iron strip in an angular manner. The leading edge of the soft iron strip is arranged virtually opposite the application slot. A curved guide element in front of the soft iron strip improves the gliding behavior of the substrate during application.

8 Claims, 2 Drawing Sheets

DEVICE FOR APPLYING MAGNETIZABLE BINDER-CONTAINING LAYERS TO NON-MAGNETIC SUBSTRATE BY MEANS OF AN EXTRUSION CASTER

BACKGROUND OF THE INVENTION

1. Field of the Invention

The present invention relates to an apparatus for applying at least one magnetizable dispersion containing pigments and polymeric binders to the front of a linearly transported nonmagnetic substrate by means of an extrusion coater, the orifice of the slot transporting the dispersion being essentially opposite the edge of the pole surface of a magnet arranged adjacent to the back of the substrate.

2. Description of the Prior Art

Apparatuses of the abovementioned generic type are disclosed, inter alia, in DE-B-19 07 212, DE-A-42 26 139 and German Patent Application P 44 43 896 of the same Applicant. A major advantage of this coating arrangement is that the applied amount of dispersion depends only on the dose supplied but, within certain limits, is independent of the distance from the extruder orifice to the substrate. As is evident from the example of the abovementioned DE-B-19 07 212, coating speeds of 100 m/min can thus readily be achieved.

Recently, substantially higher coating speeds have been required for greater cost-efficiency of the coating procedure and in addition the magnetic properties of magnetic recording media thus achieved must meet higher requirements; in particular the smoothness of the surface should be improved to achieve constant contact between the head and the magnetic recording medium.

SUMMARY OF THE INVENTION

It is an object of the present invention to start from the abovementioned prior art and improve the coating apparatus with respect to these required properties.

It is an object of the present invention to obtain a coating which is satisfactory over the coating width and has a very smooth surface, even at high coating speeds which are higher than 100, in particular higher than 500, m/min.

As is clearly evident from FIG. 1 of DE-B-19 07 212, the substrate (6) glides directly past the edge (3a) of the soft iron strip of the magnet (3). With slight fluttering of the substrate and in the case of a substrate which is wavy transverse to the web running direction, there is accordingly the danger of scratching the back of the magnetic recording medium, resulting in abrasion which adversely affects the mechanical and magnetic properties when the coated substrate is rolled up.

We have found that this object is achieved, according to the invention, by an apparatus having the features stated in the defining part of claim 1. Further details of the invention are evident from the subclaims, the description and the drawings.

With the novel apparatus it was possible to obtain a coating which is satisfactory over the coating width and has a very smooth surface, even at high coating speeds, in particular greater than 500 m/min. By the further use of a guide element having a curved guide surface, it was furthermore possible to avoid scratching the back of the substrate.

The invention is described in more detail below with reference to the Figures, in which

BRIEF DESCRIPTIONS OF THE DRAWINGS

FIG. 1 shows a schematic overview of the novel apparatus and

FIG. 2 and

Figure 3:
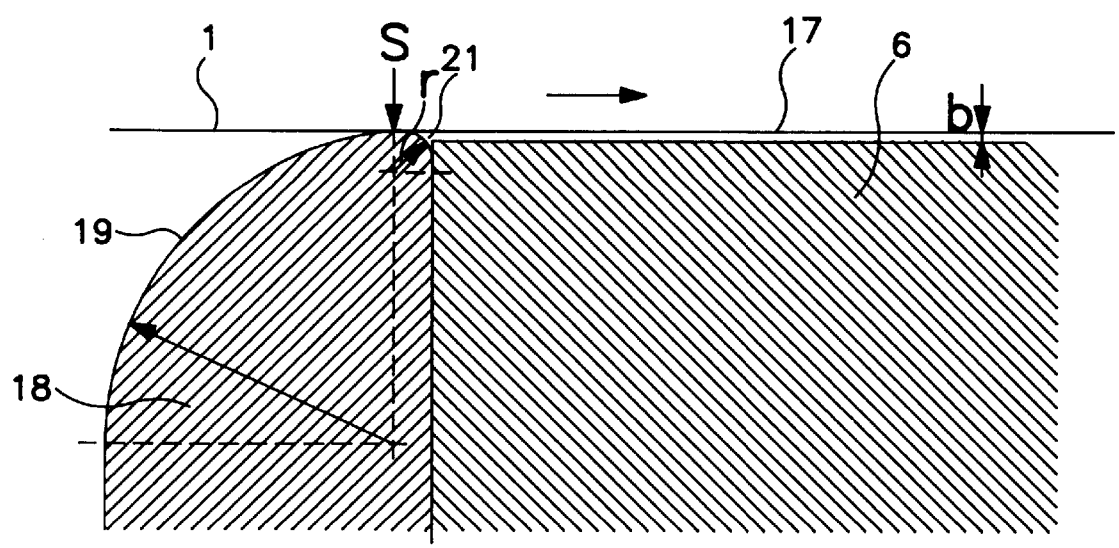

FIG. 3 show two different embodiments, based on FIG. 1, on a larger scale.

DESCRIPTIONS OF THE PREFERRED EMBODIMENTS

FIG. 1 shows that the substrate (1), which consists, for example, of a thin polyethylene terephthalate film, passes through the extrusion coating arrangement to be described in more detail, between two rotatably mounted guide rolls (10, 20) in the direction indicated by the arrow. The extrusion coater head (2) consists of an upper part (14) and a lower part (15); the dispersion is transported between said upper and lower part (in the direction indicated by the arrow) through the coater slot (4) by means of a metering apparatus (not shown) and leaves the coater through the orifice (3). The dispersion is applied as a magnetizable layer (11) to the front of the substrate (1). An essentially cuboid magnet (5) is present essentially opposite the extruder orifice (3) and adjacent to the back of the substrate (1) and is arranged in such a way that its magnetization direction is parallel to the running direction of the substrate. Instead of an individual magnet, it is also possible to use a plurality of magnets which are arranged side by side or one on top of the other and which have opposite poles adjacent to one another. This magnet is preferably enclosed on two sides by a strip (6) consisting of a magnetically soft material and referred to below as a soft iron strip, which surrounds the magnet essentially in an angular manner. The leading edge (16) of the soft iron strip (6) is opposite the coater orifice and has an angle of less than or equal to 90°, whereas the opposite edge (17) located downstream (in the direction indicated by the arrow) may be right-angled, bevelled or rounded. The edge (7) of the pole surface of the magnet (5) is advantageously in a plane with the leading edge (16) of the soft iron strip (6).

The stated magnetic arrangement rests in a block (12, 13) consisting of nonmagnetic material. As is also evident from the example below, it has been found that this magnetic arrangement modified in comparison with the prior art makes it possible to achieve a substantially smoother surface than can be achieved with the abovementioned apparatuses.

In order furthermore to avoid scratching the back of the substrate, a guide element (8) which is essentially flush with the soft iron strip (6) is located upstream of said strip and consists of nonmagnetic material and whose guide surface (9) adjacent to the edge (16) of the soft iron strip (6) is rounded.

Figure 2:
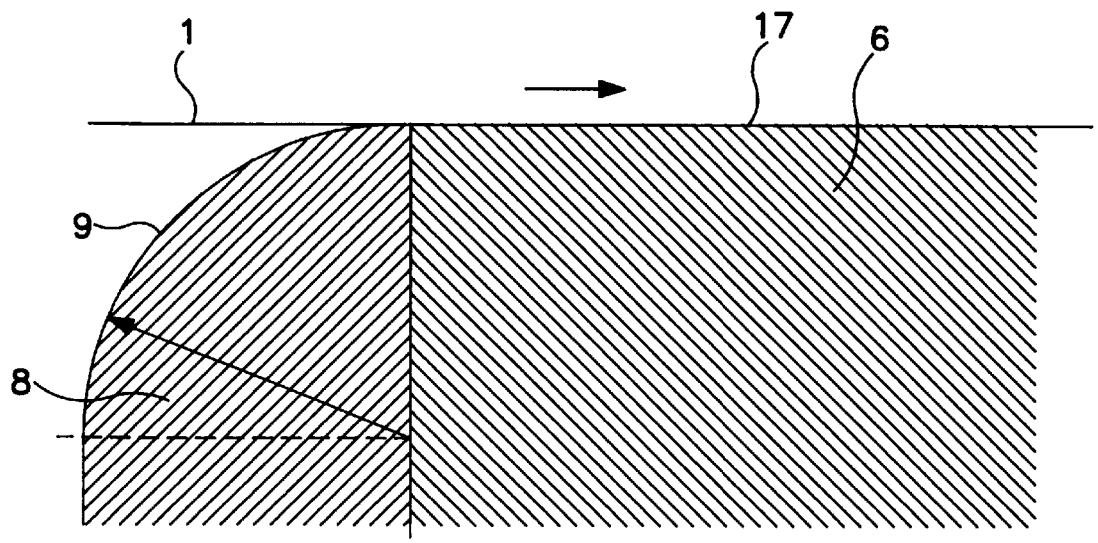

As is evident from FIGS. 2 and 3 which show views from FIG. 1 on a larger scale, the position of the guide surfaces (9, 19) of the corresponding guide elements (8, 18) relative to the terminating or end surface (17) of the soft iron strip (6), which surface is opposite the back of the substrate, is such that the highest point S of the guide surface (9, 19) either is flush with the surface (17) (FIG. 2) or projects slightly beyond said surface (FIG. 3). In both arrangements, it has been found that scratching of the back of the substrate is reliably avoided; this improvement may be due to a thin air film which is carried by the back of the substrate (1) and which the guide surfaces (9, 19) guide in such a way that the back of the substrate floats on the guide element (8, 18) and subsequently on the terminating surface (17) of the soft iron strip (6).

In the case of FIG. 3, the guide element (18) is shaped in such a way that its radius decreases downstream either continuously or abruptly starting from its summit S. This guide surface (19) then ends in a small gap between guide element (18) and soft iron strip (6). Since the summit S of the guide element (18) is higher than the terminating surface (17) of the soft iron strip (6) with respect to the substrate (1), the result is a certain minimum distance b between soft iron strip and back of film (1). In the case of FIG. 2, this distance b is even smaller and comprises only the abovementioned air film. The distance is governed by, inter alia, the film tension of the substrate (1) between the two guide rolls (10, 20).

The distance between extruder orifice (3) and substrate (1) can be varied within wide limits, for example from 0.5 to 5 mm. The dry layer thickness of the magnetizable layer (11) may likewise be from 0.5 to 20 µm. The film tension of the substrate (1) between the two guide rolls is in general from 20 to 100 N. The material of the magnet, preferably of a permanent magnet, is cuboid barium ferrite or SmcCOy Nd—Fe—B. In the case used, the dimensions of the magnet (5) were 20×19 mm and the length of the magnet corresponded to the coating width; in the present case, the total length is 700 mm. The thickness of the soft iron strip is from 5 to 15 mm. It may also comprise hardenable steel. Aluminum covered with a thin hard-wearing protective layer, for example consisting of CrN or a metal, eg. nickel, has substantially proven useful as a material for the guide surface. The roughness $R_t$ of the guide surfaces (9, 19) should not be greater than 1 µm preferably not greater than 0.5 µm. The coercive force of the magnet (5) is such that the field strength at the edge (9) of the pole surface is in general from 1000 to 4000 A/cm, depending on the coercive force of the magnetizable pigments of the magnetic dispersion.

EXAMPLE

A magnetic dispersion having the following composition was prepared.

| | Parts by weight |
|---|---|
| Co-doped $Fe_2O_3$ with $H_c$ 60 kA/m and 25 m² BET value | 122 |
| Polyurea (meth)acrylate | 7 |
| Vinyl copolymer | 6 |
| Polyester-polyurethane | 15 |
| Nitrocellulose | 4 |
| Carbon black | 11 |
| Finely divided $Al_2O_3$ | 12 |
| Lubricant | 8 |
| Wetting agent | 0.12 |
| Solvent mixture (tetrahydrofuran/dioxane) | 750 |
| Diisocyanate curing agent | 9 |

This dispersion was cast on a 15 µm thick nonmagnetic polyethylene terephthalate substrate at a coating speed of 750 m/min, the dispersion giving a layer 2.5 µm thick when dry. The arrangement of the guide surface was as shown in FIG. 3, the projection b between summit S and terminating or guide surface 17 being less than 0.5 mm. The film tension was 80 N; the magnetic field at the edge of the pole surface had a magnitude of 2500 A/cm.

Comparative Example

The procedure was as in the Example, except that the magnetic arrangement was as shown in German Patent 1,907,212, FIG. 1.

Results

The magnetic recording media thus produced were slit into a 12.7 mm (half inch) width to produce a commercial video tape for the VHS system. The Table below shows that the magnetic recording medium produced using the novel apparatus was improved with respect to roughness (Ra) of the surface, RF level and spurious color modulation (SCM) signal in comparison with that reduced using the conventional arrangement.

TABLE

| | Ra (1) | Ra (2) | RF level | SCM | Scratching |
|---|---|---|---|---|---|
| Example | 11.6 nm | 7.0 nm | +1 dB | +2.5 dB | 0 |
| Comparative Example | 18.5 nm | 8.5 nm | 0 | | 1–2 |

Notes:
0 = No scratches
1 = Increasing
· number
· of scratches
6 = Completely scratched The Ra(1) values were determined without a calendering means known from the prior art and arranged between the coating apparatus and the following drying zones.

The Ra(2) values were obtained with a calendering means.

The present invention relates to an apparatus for applying binder-containing layers to a nonmagnetic substrate by means of an extrusion coater.

A magnetic recording medium having improved mechanical and magnetic properties is obtained by having the orifice (3) of an extrusion coater (2) opposite an attracting magnet (5) which is covered with a soft iron strip (6) in an angular manner. The substrate is passed between the magnet and extrusion coater orifice, between two guide rolls. The pole direction of the magnet is aligned parallel to the running direction of the substrate, the position of the magnet and of the soft iron strip being such that the leading edge (16) (arranged upstream) is arranged essentially opposite the extrusion coater orifice. A guide element (8) having a curved guide surface (9) which is arranged, relative to the soft iron strip, in such a way that there is a minimum distance between the back of the substrate and the terminating surface (17) of the strip (6) may be present upstream of said leading edge.

This makes it possible to produce magnetic recording media at high application speed and with excellent surface characteristics on both sides.

We claim:

1. Apparatus for applying at least one magnetizable dispersion containing pigments and polymeric binders onto a substrate having a front surface and a back surface opposite to the front surface, said apparatus is comprised of an extrusion coater having a slot with an orifice for transporting the magnetic dispersion onto the substrate linearly moving in a running direction past the coater, the orifice of the slot being essentially opposite a pole surface of a magnet arranged adjacent to the back of the substrate, wherein magnetization direction of the magnet is parallel to the running direction of the substrate and the magnet is covered with a magnetically soft strip, an edge of the pole surface of the magnet which faces downstream with respect to the running direction of the substrate past the coater being flush with a leading edge of the magnetically soft strip and the magnetically soft strip enclosing the magnet at least on two sides in an angular manner.

2. Apparatus as defined in claim 1, further comprising a nonmagnetic guide element for the substrate having a guide surface which is curved and arranged upstream relative to the magnetically soft strip, the guide surface guiding the substrate at a minimum distance (b) above an end surface of the magnetically soft strip.

3. Apparatus as defined in claim 2, wherein the summit S of the guide surface is at most a distance of $\leqq 0.5$ mm above an end surface of the magnetically soft strip.

4. Apparatus as defined in claim 2, wherein the radius of curvature (r) of the guide surface decreases downstream with respect to the running direction of the substrate.

5. Apparatus as defined in claim 2, wherein the guide surface has a hard-wearing protective layer.

6. Apparatus as defined in claim 2, wherein the guide surface is covered with metal.

7. Apparatus as defined in claim 2, wherein the guide surface has a roughness $R_t$ of $\leqq 1$ μm.

8. Apparatus as defined in claim 7, where the guide surface has a roughness $R_t$ of $\leqq 0.5$ μm.

* * * * *